US012792081B2

(12) United States Patent
Okusaga et al.

(10) Patent No.: US 12,792,081 B2
(45) Date of Patent: Nov. 10, 2026

(54) NEURAL NETWORK STABILIZED CLOCK

(71) Applicant: The Johns Hopkins University, Baltimore, MD (US)

(72) Inventors: Olukayode K. Okusaga, Laurel, MD (US); Gregory L. Weaver, Carlisle, PA (US); Jeffrey F. Garstecki, Sugar Mountain, NC (US); John B. Hamilton, Gambrills, MD (US); Trey S. Schmidt, Laurel, MD (US); Samuel P. Reynolds, Jr., Bowie, MD (US)

(73) Assignee: The Johns Hopkins University, Baltimore, MD (US)

( * ) Notice: Subject to any disclaimer, the term of this patent is extended or adjusted under 35 U.S.C. 154(b) by 517 days.

(21) Appl. No.: 18/086,918

(22) Filed: Dec. 22, 2022

(65) Prior Publication Data

US 2023/0205253 A1 Jun. 29, 2023

Related U.S. Application Data

(60) Provisional application No. 63/293,174, filed on Dec. 23, 2021.

(51) Int. Cl.
*G06F 1/08* (2006.01)
*G06N 3/048* (2023.01)

(52) U.S. Cl.
CPC ............... *G06F 1/08* (2013.01); *G06N 3/048* (2023.01)

(58) Field of Classification Search
CPC .......... G06F 1/08; G06N 3/048; G06N 3/044; G06N 3/0464; G06N 3/09; H03L 1/026; H03L 1/027
See application file for complete search history.

(56) References Cited

U.S. PATENT DOCUMENTS

2002/0005765 A1* 1/2002 Ashley .................... H03L 1/026 331/158
2006/0089824 A1* 4/2006 Siekmeier .............. G16C 20/30 703/11

(Continued)

OTHER PUBLICATIONS

Wallis et al., "An Advanced Synthesized Ultra-Stable Oscillator for Spacecraft Applications," 2005 IEEE Aerospace Conference, Big Sky, MT, USA, 2005, doi: 10.1109/AERO.2005.1559386, pp. 1-9.

(Continued)

*Primary Examiner* — Shelby A Turner
*Assistant Examiner* — Cynthia L Davis
(74) *Attorney, Agent, or Firm* — Noah J. Hayward

(57) ABSTRACT

A clock circuit apparatus includes a resonator configured to output an uncompensated clock signal and a temperature sensor assembly operably coupled to the resonator. The temperature sensor assembly may be configured to measure temperature and provide temperature measurements. The clock circuit apparatus may also include compensation circuitry configured to receive the uncompensated clock signal, receive the temperature measurements and generate temperature data based on the temperature measurements, apply a frequency predicting neural network to the temperature data to determine a frequency correction, apply the uncompensated clock signal and the frequency correction to a synthesizer to generate a stabilized clock output signal, and output the stabilized clock output signal.

16 Claims, 6 Drawing Sheets

(56) References Cited

U.S. PATENT DOCUMENTS

| | | | | |
|---|---|---|---|---|
| 2016/0099716 A1* | 4/2016 | Kobayashi | H03L 1/026 327/115 |
| 2016/0241186 A1* | 8/2016 | Motz | G01D 3/02 |
| 2017/0344884 A1* | 11/2017 | Lin | G06N 3/048 |
| 2019/0238139 A1* | 8/2019 | Haneda | H03H 9/1021 |
| 2020/0052704 A1* | 2/2020 | Raghavan | H03L 1/028 |
| 2020/0274512 A1* | 8/2020 | Uehara | H03B 5/04 |

OTHER PUBLICATIONS

Miranian et al., "An Ensemble of Ultra-Stable Quartz Oscillators to Improve Spacecraft Onboard Frequency Stability," Proceedings of the 38th Annual Precise Time and Time Interval (PTTI) Meeting, Dec. 2006, pp. 361-372.

Weaver et al., "GRAIL USOs; Another In-Flight Quartz Radiation Experiment," 2013 Joint European Frequency and Time Forum & International Frequency Control Symposium (EFTF/IFC), Prague, Czech Republic, 2013, doi: 10.1109/EFTF-IFC.2013.6702169, pp. 200-208.

Jensen et al., "Frequency Performance of the New Horizons Ultra-stable Oscillators," 2015 Joint Conference of the IEEE International Frequency Control Symposium & the European Frequency and Time Forum, 2015, doi: 10.1109/FCS.2015.7138810, pp. 1-6.

Shapira et al., "An Ultra Stable Oscillator for the 3GM Experiment of the JUICE Mission," 2016 European Frequency and Time Forum (EFTF), 2016, doi: 10.1109/EFTF.2016.7477766, pp. 1-5.

Enzer et al., "In Situ Measurements of USO Performance in Space using the Twin GRAIL Spacecraft," 2012 IEEE International Frequency Control Symposium Proceedings, 2012, doi: 10.1109/FCS.2012.6243731, pp. 1-5.

Little et al., "Sensor Webs of Earth Science Instruments to Improve our Understanding of Natural Phenomena and Physical Processes," IGARSS 2018—2018 IEEE International Geoscience and Remote Sensing Symposium, 2018, doi: 10.1109/IGARSS.2018.8517513, pp. 264-266.

Ryabov et al., "Direct Digital Synthesizer with Fast Frequency Tuning," 2018 Systems of Signal Synchronization, Generating and Processing in Telecommunications (SYNCHROINFO), 2018, doi: 10.1109/SYNCHROINFO.2018.8456988, pp. 1-3.

Krzyzak et al., "Radial Basis Function Networks and Complexity Regularization in Function Learning," IEEE Transactions on Neural Networks, vol. 9, No. 2., 1998, doi: 10.1109/72.661120, pp. 247-256.

Liu et al., "Avoiding Overfitting Caused by Noise Using a Uniform Training Mode," IJCNN'99 International Joint Conference on Neural Networks Proceedings (Cat. No. 99CH36339), 1999, doi: 10.1109/IJCNN. 1999.832649, pp. 1788-1793.

Li et al., "Fast Computation of Time Deviation and Modified Allan Deviation for Telecommunications Clock Stability Characterization," Proceedings International Symposium on Parallel Architectures, Algorithms and Networks. I-SPAN 2000, 2000, doi: 10.1109/ISPAN.2000.900280, pp. 156-160.

* cited by examiner

NEURAL NETWORK STABILIZED CLOCK

CROSS-REFERENCE TO RELATED APPLICATIONS

This application claims priority to and the benefit of prior-filed, U.S. Provisional Application No. 63/293,174 filed on Dec. 23, 2021, the entire contents of which are hereby incorporated herein by reference.

TECHNICAL FIELD

Exemplary embodiments generally relate to clock technologies in electronic devices, and more specifically relate to techniques for implementing a stabilized clock for use in electronic devices.

BACKGROUND

Many electronic devices and systems, particularly communications devices and systems, must be able to keep time or operate a clock for general processing and for synchronization with other devices and systems. Clock circuitry is often built based on the operation of a resonator, such as a crystal oscillator, that generates a periodic signal that can be used as a clock signal. An ideal resonator would output a signal with a stable frequency that does not vary, regardless of changes in environmental conditions. Unfortunately, such ideal resonators do not exist because changes in environmental conditions have an impact on the signal that is output by the resonator. Changes in temperature, in particular, can have an impact on the signal that is output from resonator by changing the output frequency. Such changes in temperature can cause the resonator to lose stability in its output signal, and since the resonator and its output signal are often fundamental to the operation of the device, the overall operation of the device can be affected. As a result, operational timing can be unpredictable and synchronization can be lost.

Accordingly, a technical problem continues to exist with respect to the effects of changes in temperature on a resonator and a time-keeping circuit of an electronic device. As such, technical solutions that operate to compensate for the effects of temperature on a resonator or other timing technology would be desirable.

BRIEF SUMMARY

According to some example embodiments, a clock circuit apparatus is provided. The clock circuit apparatus may include a resonator configured to output an uncompensated clock signal and a temperature sensor assembly operably coupled to the resonator. The temperature sensor assembly may be configured to measure temperature and provide temperature measurements. The clock circuit apparatus may also include compensation circuitry configured to receive the uncompensated clock signal, receive the temperature measurements and generate temperature data based on the temperature measurements, apply a frequency predicting neural network to the temperature data to determine a frequency correction, apply the uncompensated clock signal and the frequency correction to a synthesizer to generate a stabilized clock output signal, and output the stabilized clock output signal.

According to some example embodiments, a communications device is provided. The communications device may include an antenna and a transmitter. The transmitter may be configured to output radio signals via the antenna in association with a stabilized clock output signal. The communications device may also include a receiver configured to receive radio signals via the antenna in association with the stabilized clock output signal. Additionally, the communications device may include a clock circuit. The clock circuit may include a resonator configured to output an uncompensated clock signal, and a temperature sensor assembly operably coupled to the resonator. The temperature sensor assembly may be configured to measure temperature and provide temperature measurements. The clock circuit may also include compensation circuitry configured to receive the uncompensated clock signal, receive the temperature measurements and generate temperature data based on the temperature measurements, apply a frequency predicting neural network to the temperature data to determine a frequency correction, apply the uncompensated clock signal and the frequency correction to a synthesizer to generate a stabilized clock output signal, and output the stabilized clock output signal to the transmitter and the receiver.

According to some example embodiments, a method for implementing a clock circuit is provided. The method may include receiving an uncompensated clock signal from a resonator, receiving temperature measurements from a temperature sensor assembly, and generating temperature data based on the temperature measurements. The temperature sensor assembly may be operably coupled to the resonator. The method may further include applying, by compensation circuitry, a frequency predicting neural network to the temperature data to determine a frequency correction, applying the uncompensated clock signal and the frequency correction to a synthesizer to generate a stabilized clock output signal, and outputting the stabilized clock output signal.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
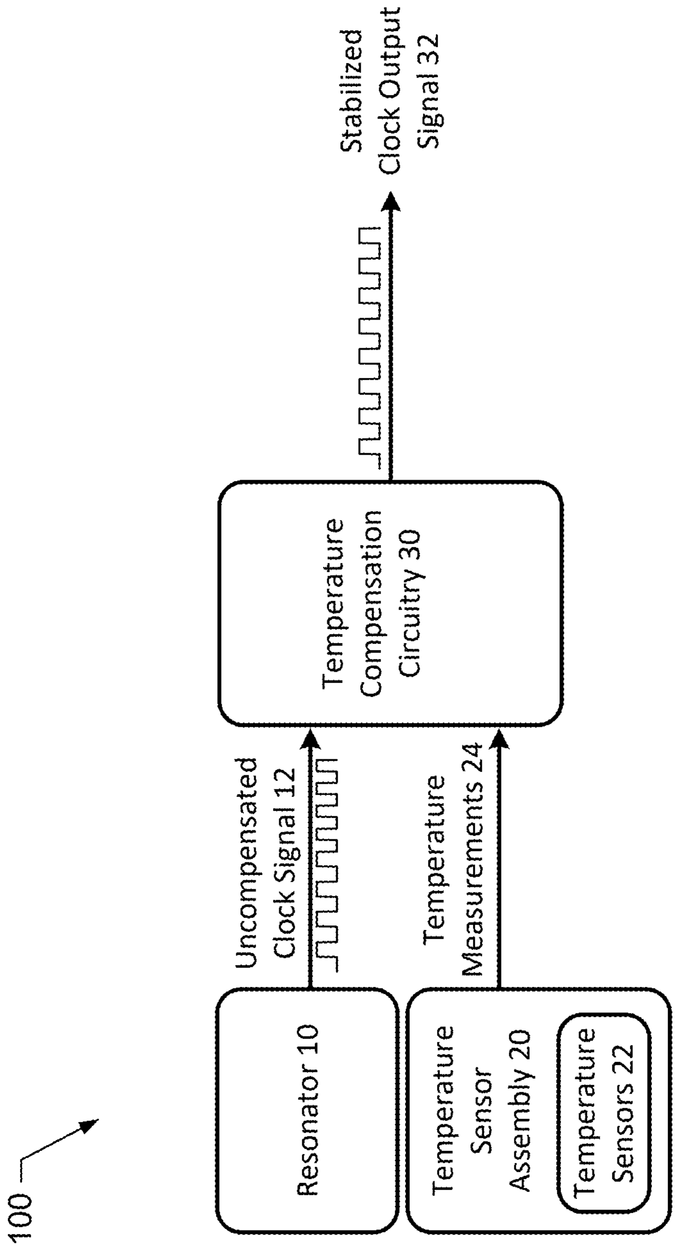
FIG. 1 illustrates a block diagram of a stable clock system according to some example embodiments.

Some non-limiting, example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments address the issues raised above by implementing a technical solution that involves compensating for environmental changes that effect the operation of a resonator that may be used to provide a clock signal for an electronic device, such as a wireless communications device. To do so, some example embodiments employ a compensation approach that involves the use of temperature sensors to take temperature measurements at one or more locations on the resonator and use the temperature measurements as inputs to a frequency predicting neural network that determines a frequency correction to be used for generating a stable clock signal output that compensates for changes in temperature. According to some example embodiments, a plurality of temperature sensors may be operably coupled (e.g., physically connected) to the resonator at defined locations so that a temperature profile through the volume of the resonator can be determined. In this regard, three-dimensional temperature gradients across the resonator can be determined. Since the operation of many resonators are effected by such temperature gradients, this information can be provided to the frequency predicting neural network to perform increasingly accurate predictions of resonator behavior for use in determining the frequency correction. Additionally or alternatively, example embodiments may also store past temperature data that can be used by the frequency predicting neural network when determining the frequency correction. For example, temperature measurements may be captured and stored in memory, and then the frequency predicting neural network may retrieve the temperature readings at certain past times for use in generating the frequency correction. As such, according to some example embodiments, the frequency predicting neural network may consider one or both of historical temperature measurements and temperature gradients in determining the frequency correction.

According to some example embodiments, the frequency correction may be used with a synthesizer to generate the stable clock output. The synthesizer may operate both to apply the frequency correction for stability, but also to output a desired frequency signal that is different from the nominal frequency of the resonator. According to some example embodiments, the synthesizer may be a direct digital synthesizer. In this regard, the synthesizer may be configured to receive the uncompensated clock output signal from the resonator and the frequency correction from the circuitry implementing the frequency predicting neural network to generate a stabilized clock output. According to some example embodiments, the synthesizer may be configured to apply the frequency correction as a multiplier (or divider) to the uncompensated clock signal, with the effect being that the output of the synthesizer is stable due to the frequency correction compensating for changes in the frequency of the resonator, due to changes in temperature.

Additionally, according to some example embodiments, a temperature control assembly may be implemented to apply thermal inputs in an effort to stabilize the temperature of the resonator. In this regard, in addition to performing the frequency correction, controllable thermal devices that can heat or cool, may be operably coupled to the resonator to maintain a desired temperature range for the resonator. In this regard, using the temperature measurements from the temperature sensors, a temperature feedback loop can be implemented where the thermal devices are continuously controlled to offset changes in temperature. Such temperature control may be unable to maintain the temperature of the resonator in a sufficiently small range, and therefore such temperature control implemented with the frequency correction may result in additional stability in the clock output. However, implementation of the thermal devices may limit the temperature fluctuations of the resonator thereby simplifying the implementation of the frequency predicting neural network, since a smaller range of possible temperatures may be considered. According to some example embodiments, the clock output that is generated in this manner may result in a highly-stable radio frequency (RF) source.

Various example embodiments of a clock circuit are described herein that operate to implement an ultra-stable oscillator (USO) that is smaller in size and weight, and requires less power than conventional solutions. In particular, due to the ability to predict and compensate for the changes in the frequency of the resonator, bulky insulation and related mechanical components may be unnecessary, while still achieving a stabilized clock output signal. In this regard, according to some example embodiments described herein, an instability measurement of better than $10^{-12}$ Modified Allan Deviation (MDEV) can be realized, for example, on timescales from 1 to 1000 seconds.

Example embodiments described herein may be useful in a variety of settings, including with communications systems that transmit and receive over long distances. For example, some of the example embodiments may be beneficial in systems that perform satellite-to-satellite or satellite-to-ground communications. Due to the temperature fluctuations caused by heat sources such as the sun or high-power communications components that may be located near the resonator, example embodiments described herein may have particular applicability within the context of satellite and space-related communications applications. Further, implementations of example embodiments to generate a stable clock output signal may also be useful in image and signal geolocation applications, synthetic aperture radar applications, high-bandwidth communications, and precision navigation.

Having described some aspects of example embodiments, reference is now made to FIG. 1, which provides a functional block diagram of a stable clock system 100 according to some example embodiments. In this regard, the system 100 may include a resonator 10, a temperature sensor assembly 20, and temperature compensation circuitry 30.

According to some example embodiments, the resonator 10, as mentioned above, may be configured to output a clock signal, which may be referred to as an uncompensated clock signal 12. A clock signal, according to some example embodiments, may be a repeating or periodic series of high and low voltages. As such, the clock signal may have a frequency. The clock signal that is output by the resonator 10 may take a variety of forms, such as a sine wave, a square wave, a sawtooth wave, a triangle wave, or the like. The resonator 10 may be embodied as a crystal oscillator, a ceramic resonator, a tank circuit, or the like. For example, as a quartz crystal resonator or oscillator, a crystal may be excited and caused to vibrate at a desired frequency to generate the clock output signal. Such a quartz oscillator may output an uncompensated clock signal that has a frequency of, for example, 5 to 10 megahertz (MHz). However, the vibrations in the crystal may be effected by changes in temperature such that the crystal vibrates at slightly different frequencies at different temperatures. As a result, the frequency of the clock output signal of the quartz crystal resonator may be temperature dependent.

The temperature sensor assembly 20 may include one or more temperature sensors 22 that operate to provide an output signal that is temperature dependent. In this regard, a temperature sensor 22 of the temperature sensor assembly 20 may measure a local temperature and provide an output as a temperature measurement 24. The temperature sensors 22 may be embodied in a number of different ways according to various example embodiments. For example, the temperature sensors may be thermocouples, resistance temperature detectors (RTDs), thermistors, semiconductor-based temperature sensors, or the like. As further described below, in example embodiments where more than one temperature sensor 22 is utilized, the temperature sensors 22 may be strategically placed in operable coupling with the resonator 10 to be able to measure three-dimensional temperature gradients across the resonator 10.

The temperature compensation circuitry 30 may be a collection of electronic circuit components configured to receive the uncompensated clock signal 12 from the resonator 10 and the temperature measurements 24 from the temperature sensor assembly 20 and generate a stable clock output signal 32. The temperature compensation circuitry 30 may include various components including, for example, a processor and a memory configured to implement a neural network as a frequency predicting neural network. In this regard, the frequency predicting neural network may be configured to receive temperature data based on the temperature measurements 24 and make a prediction of a future temperature that may affect the frequency output behavior of the resonator 10. Accordingly, the frequency predicting neural network may be able to predict the future frequency that would be output by the resonator 10 based on the predicted temperature. The predicted frequency may be converted into a frequency correction that is used by a synthesizer to adjust uncompensated clock signal 12 and generate the stable clock output signal 32.

As further described herein, the frequency predicting neural network may be implemented based on certain inputs. In this regard, for example, the inputs may include temperature data based on the temperature measurements. The temperature data may include data indicative of current temperature measurements and, in some example embodiments, past temperature measurements. In this regard, the past temperature measurements may be measurements taken at certain past intervals relative to the current time. For example, the temperature measurements that may be retrieved from storage for use in the determination of the frequency correction may include a predefined number of measurements N taken at current time minus a defined offset. For example, according to some example embodiments, the offset may be a repeated time period such that the timing has a linear relationship. As such, measurements that may be used as inputs may be measurements taken at (current time−10 seconds), (current time−20 seconds), (current time−30 seconds), and (current time−40 seconds). Alternatively, the offset may be defined such that the timing has an exponential relationship. As such, measurements that may be used as inputs may be measurements taken at (current time−1 second), (current time−10 seconds), (current time−100 seconds), and (current time−1000 seconds).

Additionally, the measurements may be considered with respect to the location of measured temperature relative to the resonator 10. As mentioned above, the temperature sensors 22 may be located in positions where temperature gradients across the resonator 10 can be analyzed by the frequency predicting neural network for use in determining the frequency correction. In this regard, the frequency predicting neural network may be based on a resonator model that includes information regarding the effect of temperature gradients between various dimensions of the resonator 10. For example, the effect on the resonator 10 when the temperature is higher at a top of the resonator 10 relative to the bottom of the resonator 10 may be modeled and included in the frequency predicting neural network. As such, the differences in temperature at different locations on the resonator 10 and the associated temperature gradients that result from such differences in temperature may be used as inputs to the frequency predicting neural network.

Based on the foregoing, the frequency predicting neural network may consider temperature data that is defined in multiple dimensions. In this regard, temperature data that is defined with respect to both location and time may be considered. Therefore, the frequency predicting neural network may be trained in a machine learning manner to consider such temperature data in these dimensions for application in the context of frequency correction to support the operation of a clock circuit having a stable output signal. Such training may consider both the uncompensated clock signal from a resonator (e.g., within a lab) and temperature measurements for training.

The frequency predicting neural network may be implemented to determine a frequency correction, and the frequency correction may be provided, according to some example embodiments, as an input to a synthesizer of the temperature compensation circuitry 30. According to some example embodiments, the synthesizer may receive the frequency correction and the uncompensated clock signal 12 and generate the stable clock output signal 32 based on these two inputs. According to some example embodiments, the frequency correction may be provided as a multiplier (or divider) that is applied to the uncompensated clock signal 12 to adjust the frequency of the uncompensated clock signal 12 based on the multiplier.

Figure 2:
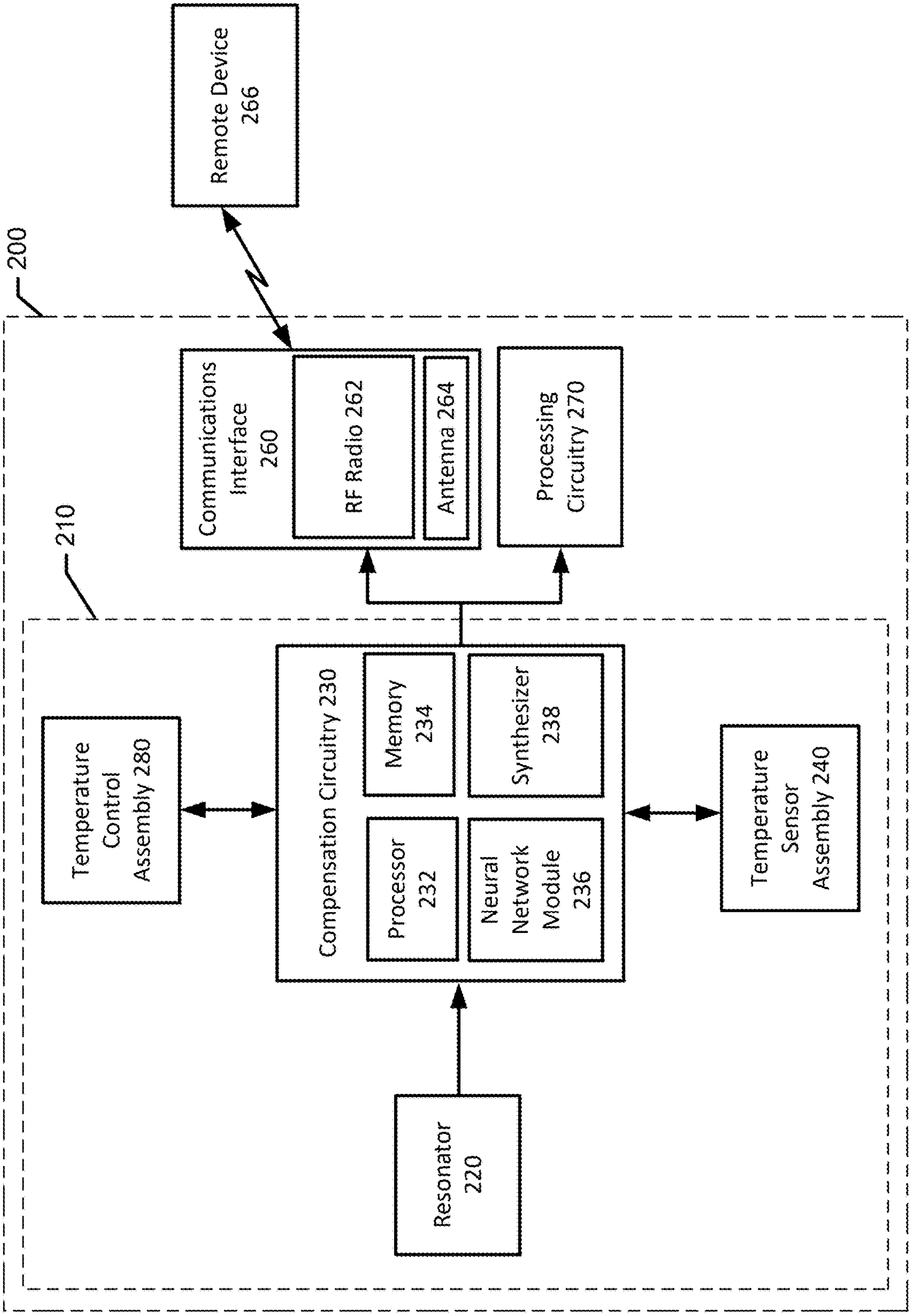
FIG. 2 illustrates an example electronic device including a clock circuit according to some example embodiments.

Now referring to FIG. 2, an electronic device 200 that includes a clock circuit according to some example embodiments is shown. The electronic device 200 may be any type of device that relies upon the operation of the clock circuit to perform functionality or operations. In this regard, according to some example embodiments, the electronic device 200 may be a processing device that receives inputs and provides outputs. Additionally or alternatively, the electronic device 200 may be a communications device for communicating in a wired or wireless manner, and may rely upon the operation of the clock circuit to conduct communications operations. As such, according to some example embodiments, the electronic device 200 may include a clock circuit 210 (also referred to as a clock circuit apparatus), a communications interface 260, and processing circuitry 270. As mentioned above, the communications interface 260 and the processing circuitry 270 may require a clock signal, and more specifically a stable clock signal, as an input for maintaining timing of the components and circuitry.

The communications interface 260 may include one or more interface mechanisms for enabling communication with other devices external to the electronic device 200, via, for example, a network, which may, for example, be a local area network, the Internet, or the like. The communications interface 260 may also be configured to enable communication through a direct (wired or wireless) communication link to another external device (e.g., remote device 266), or the like. In some cases, the communications interface 260 may be any means such as a device or circuitry embodied in either hardware, or a combination of hardware and software, that is configured to receive or transmit data from/to devices in communication with the electronic device 200. The communications interface 260 may be a wired or wireless interface and may support various communications protocols (WI-FI®, BLUETOOTH®, cellular, or the like). However, as shown in FIG. 2, the communications interface 260 may be an embodied as a wireless communications interface that includes a radio frequency (RF) radio 262 and an antenna 264. The RF radio 262 may be configured to condition a communications signal for transmission via the antenna 264 or condition a wireless signal received via the antenna 264 for decoding. In operation, the RF radio 262 may rely upon a clock signal to perform such conditioning operations and may also rely on the clock signal for communications timing. In this regard, wireless communications with the remote device 266 may be generated based on the stable clock output signal provided to the communications interface 260 by the compensation circuitry 230.

The processing circuitry 270 may include a processor that uses the stable clock output signal to clock the processor to perform operations. As such, operation of the processing circuitry 270 may be based on the stability of the clock signal that is output from the clock circuit 210. The clock circuit 210 may include a resonator 220, compensation circuitry 230, and a temperature sensor assembly 240. According to some example embodiments, the clock circuit 210 may also include a temperature control assembly 280. The resonator 220 may be the same or similar to the resonator 10 described above, and may therefore be configured to output an uncompensated clock signal to the compensation circuitry 230.

The compensation circuitry 230 may include a variety of components that may be physical components or modules implemented by a component. In this regard, the compensation circuitry 230 may include a processor 232, a memory 234, a neural network module 236, and a synthesizer 238. The compensation circuitry 230 may interface with the communications interface 260 and the processing circuitry 270 by providing a stable clock output signal. According to some example embodiments, various additional components may be coupled to the compensation circuitry 230 to perform the various functionalities described herein. Further, according to some example embodiments, compensation circuitry 230 may be in operative communication with or embody, the memory 234, the processor 232, the neural network module 236, and the synthesizer 238. Through configuration and operation of the processor 232, the memory 234, the neural network module 236, and the synthesizer 238, the compensation circuitry 230 may be configurable to perform various operations as described herein, including the operations and functionalities described with respect to generating a stable clock output signal. In this regard, the compensation circuitry 230 may be configured to perform signal processing, computational processing, memory management, sensor control and monitoring, thermal control and monitoring, or the like. In some embodiments, the compensation circuitry 230 may be embodied as a chip or chip set. In other words, the compensation circuitry 230 may include one or more physical packages (e.g., chips) including materials, components or wires on a structural assembly (e.g., a baseboard). In this regard, the compensation circuitry 230 and other elements of the compensation circuitry 230 may be disposed on a single chip as a system-on-a-chip configuration. The compensation circuitry 230 may be configured to receive inputs (e.g., via peripheral components), perform actions based on the inputs, and generate outputs (e.g., for provision to peripheral components). In an example embodiment, the compensation circuitry 230 may include one or more instances of a processor 232, associated circuitry, and memory 234. As such, the compensation circuitry 230 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 234 may include one or more non-transitory memory devices such as, for example, volatile or non-volatile memory that may be either fixed or removable. The memory 234 may be configured to store information, data, applications, instructions or the like for enabling, for example, the functionalities described with respect to the compensation circuitry 230. According to some example embodiments, the memory 234 may be configured to store temperature data that is based on temperature measurements. The memory 234 may also operate to buffer instructions and data during operation of the compensation circuitry 230 to support higher-level functionalities, and may also be configured to store instructions for execution by the compensation circuitry 230. The memory 234 may also store various information including the temperature data, neural network models, and the like. According to some example embodiments, various data stored in the memory 234 may be generated based on other data that has been received from other sources, but has been processed for use in the various functionalities described herein.

As mentioned above, the compensation circuitry 230 may be embodied in a number of different ways. For example, the compensation circuitry 230 may be embodied as various processing means such as one or more processors 205 that may be in the form of a microprocessor or other processing element, a coprocessor, a controller or various other computing or processing devices including integrated circuits such as, for example, an ASIC (application specific integrated circuit), an FPGA, a graphics processing unit (GPU), a tensor processing unit (TPU), or the like. According to some example embodiments, a processor 205 may include a processing device tailored for artificial intelligence and neural network inferencing (e.g., a GOOGLE® CORAL® TPU). In an example embodiment, the compensation circuitry 230 may be configured to execute instructions stored in the memory 234 or instructions otherwise accessible to the compensation circuitry 230. As such, whether configured by hardware or by a combination of hardware and software, the compensation circuitry 230 may represent an entity (e.g., physically embodied in circuitry—in the form of compensation circuitry 230) capable of performing operations according to example embodiments while configured accordingly. Thus, for example, when the compensation circuitry 230 is embodied as an ASIC, FPGA, or the like, the compensation circuitry 230 may be specifically configured hardware for conducting the operations described herein. Alternatively, as another example, when the compensation circuitry 230 is embodied as an executor of software instructions, the instructions may specifically configure the compensation circuitry 230 to perform the operations described herein.

According to some example embodiments, the neural network module 236 may be implemented in hardware or software, as described above, by the processor 232 and the memory 234. The neural network module 236 may be configured to implement the frequency predicting neural network described above. In this regard, the frequency predicting neural network may be executed to generate a frequency correction for provision to the synthesizer 238. The compensation circuitry 230 may be configured to receive temperature measurements from the temperature sensor assembly 240, convert the measurements into temperature data, and apply the temperature data to the frequency predicting neural network to generate a frequency correction.

For training the frequency predicting neural network, a machine learning/artificial intelligence model for the resonator 220 may be created based on test data and possibly prior temperature measurements received by the compensation circuitry 230. According to some example embodiments, the model that is trained from these activities may be a construct in the form of a neural network, and more particularly a frequency predicting neural network as described herein. The frequency predicting neural network may be constructed based on a neural network architecture, such as, for example, a multilayer perceptron (MLP), a convolutional neural network (CNN), a recurrent neural network (RNN), combinations thereof, or the like. Further, according to some example embodiments, the frequency predicting neural network may be a multi-layer artificial neural network, although single layer implementations of the frequency predicting neural network may still realize a highly stable solution. In implementation, the frequency predicting neural network may receive the temperature data or retrieve the temperature data from the memory 234 as a vector of inputs. In some example embodiments, the frequency predicting neural network may perform a weighted sum of the inputs to determine a resultant, and then apply the resultant to a non-linear activation function to determine a predicted frequency for the resonator 220 for use in generating the frequency correction.

According to some example embodiments, the frequency predicting neural network may be constructed to operate based on a plurality of neurons. Each neuron may operate to receive vector inputs, perform a weighted sum of the inputs (e.g., with internal tuning parameters), and pass the result through a non-linear activation function. According to some example embodiments, neurons of the neural network may be chained together and grouped into layers. As a result of such a configuration, complex mapping functions can be obtained. Further, each neuron may be associated with a set of tunable parameters, which may lead to an outcome where the use of too many neurons can lead to over-fitting data.

According to some example embodiments, an example implementation of the frequency predicting neural network may include receiving temperature data based on the temperature measurements as a filtered data set with time-delayed portions. In this regard, the temperature measurements may be filtered, for example, with a single pole averaging filter with a −3 dB cutoff frequency at a desired level (e.g., approximately 8 mHz in an example implementation). The measurements from each temperature sensor may be filtered in this manner, for example, to provide a diversity of sample points around a perimeter of the resonator 220.

With respect to time delayed temperature measurements, temperature data resulting from the filtering may then be stored in a memory, such as a large shift register. To pull temperature data at certain past times, the register may be tapped at various locations to sample data at the current time, as well as, for example, 1, 10, 100, and 1000 seconds in the past. Accordingly, each temperature sensor may provide 5 temperature values, and these values, for all sensors, can be concatenated to provide an input vector to the neural network. As an input vector, the values are subjected to a linear scaling for the temperature inputs and frequency outputs, such that all values are contained within the region [−1, 1], which is used to be comparable to the output of the activation function and greatly improves time to convergence.

The first 2 layers of the neural network may consist of, for example, 20 neurons each, and a hyperbolic tangent activation function may be used. The final layer of the neural network may involve the summation of the output from the previous layer. Using the fixed and stored linear scaling values, the output of the neural network may then be un-scaled, which results in an estimate of the resonator frequency in hertz. Based on this estimate, the frequency correction may be determined.

As such, the frequency predicting neural network may use temperature data to determine the frequency correction for use in generating the stable clock output signal. The model used to determine frequency correction may operate to determine the frequency shifts in the uncompensated clock signal of the resonator 220. The temperature data may be based on temperature measurements taken by the temperature sensor assembly 240. The temperature sensor assembly 240 may be the same or similar to the temperature sensor assembly 20 described above. As such, the temperature sensor assembly 240 may include one or more temperature sensors (i.e., same or similar the temperature sensors 22). According to some example embodiments, the temperature sensor assembly 240 may include a plurality of temperature sensors. In order to support temperature gradient determination, as described herein, the temperature sensors may be located at certain positions in relation to the resonator 220. Through placement of the temperature sensors at defined locations on the exterior (e.g., housing) of the resonator 220, temperature gradients within the resonator 220 may be determined across the entire volume of the resonator 220 (i.e., in three dimensions).

Figure 3A:
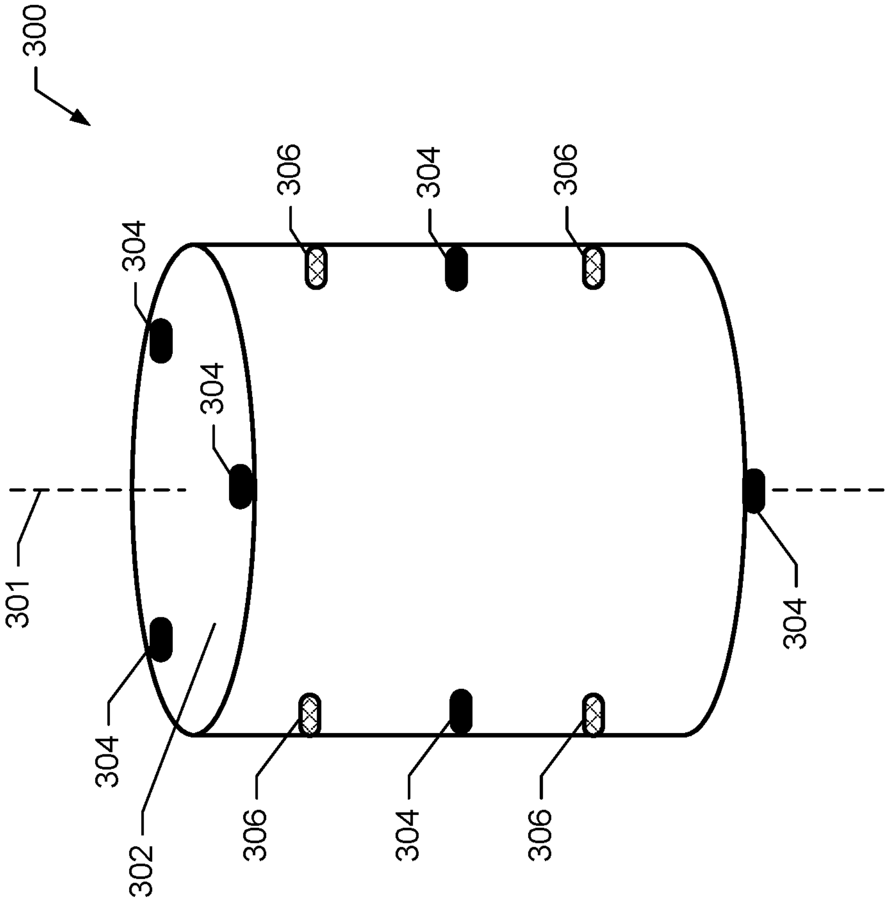
FIGS. 3A-3C illustrate views of a resonator with temperature sensors and thermal devices according to some example embodiments.
Figure 3C:
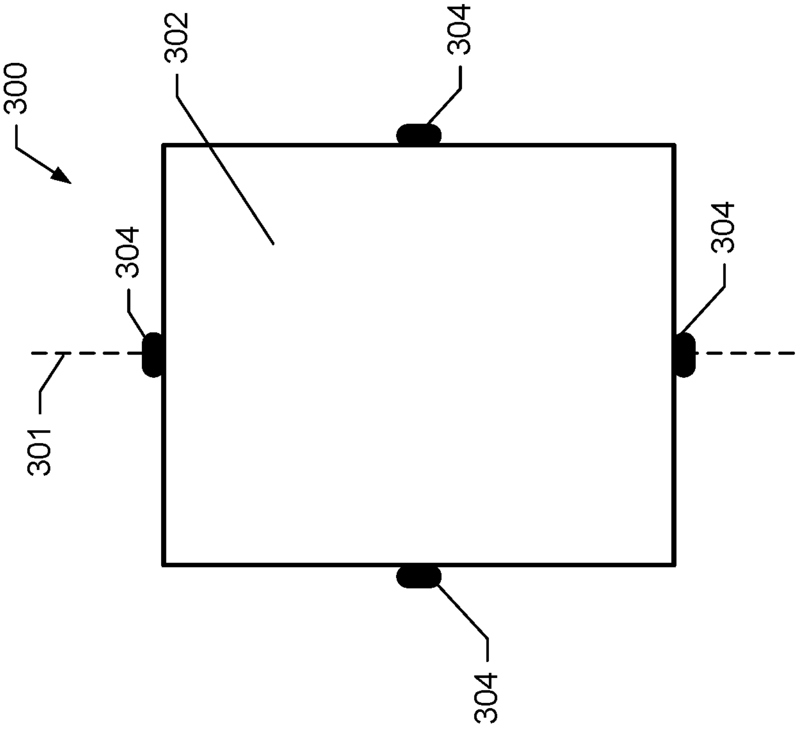
Figure 3B:
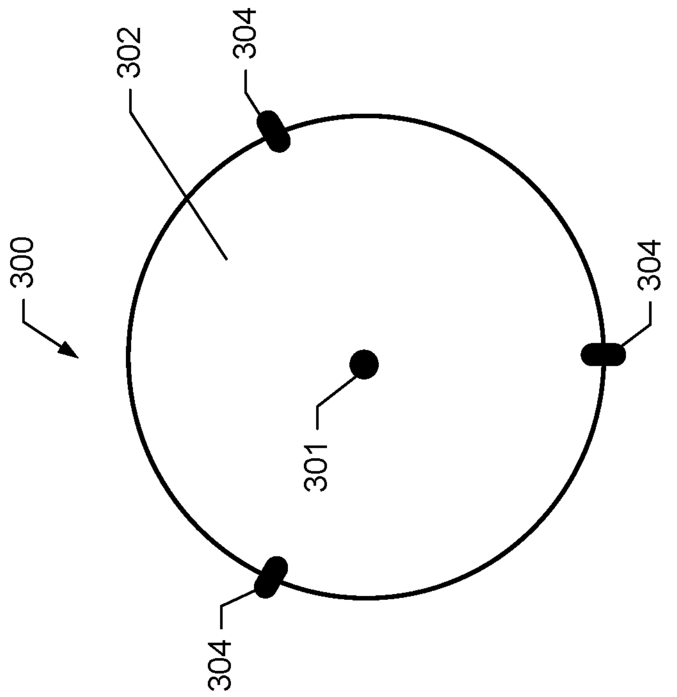

With reference to FIGS. 3A-3C, the positioning of temperature sensors 304 on a housing 302 of a resonator 300 is shown. In this regard, FIG. 3A shows a side perspective view of the resonator 300, FIG. 3B shows a top view (which may also be the same as a bottom view), and FIG. 3C shows a side view. The resonator 300 may be an example embodiment of the resonator 220 described above, and the temperature sensors 304 may be temperature sensors of the temperature sensor assembly 240, which may be the same or similar to the temperature sensors 22. In this regard, according to some example embodiments, the resonator 300 may have a housing 302, such as a metal or aluminum hosing, within which a resonator device (e.g., crystal) may be disposed. As such, according to some example embodiments, a single temperature sensor 304 may be operably coupled to the housing 302 to measure a temperature of the housing 302 and thus the resonator 300. However, according to some example embodiments, particularly those that are based on temperature gradient determinations, a plurality of temperature sensors 304 may be operably coupled to the housing 302. The temperature sensors 304 may be operably coupled in a manner that the temperature of the housing 302 at location where the temperature sensors 304 are applied can be detected. As such, the temperature sensors 304 may be operably coupled such that the sensors 304 are directly attached to the housing 302 or indirectly attached in a manner that still permits measurement of the temperature at the target location on the housing 302. In this regard, according to some example embodiments, the temperature sensors 304 may be placed in defined positions on the housing 302 in order to detect temperatures at the respective locations and support the ability to determine temperature gradients across the resonator 300, as described herein.

According to some example embodiments, the housing 302 of the resonator 300, which may be a quartz resonator, may have a cylindrical shape as shown in FIG. 3A. As such, the cylindrical shape of the resonator 300 may define a central axis 301 that extends normal to the circular ends of the cylinder. The central axis 301 may define a reference line about which the temperature sensors 304 may be, for example, symmetrically placed. In this regard, as seen in FIGS. 3A-3C, temperature sensors 304 may be disposed on the top face and bottom face of the resonator 300. As shown in FIGS. 3A and 3B, the temperature sensors 304 may be located, for example, at the apexes of an equilateral triangle centered at the axis 301, where the apexes are located at the edge or perimeter. With respect to the sides of the resonator 220, temperature sensors 304 may be located, for example, on a plane that is defined at a mid-point on the axis 301, where the plane is perpendicular to the axis 301. Again, the temperature sensors 304 may be located, for example, at the apexes of an equilateral triangle that extends to the perimeter with the axis 301 at the center.

As such, the configuration of the temperature sensors 304 may define an example temperature sensor assembly according to some example embodiments, where the temperature sensor assembly is operatively connected to the compensation circuitry 230 to provide temperature measurements to the compensation circuitry 230. Additionally, one of ordinary skill in the art would appreciate that the configuration of temperature sensors 304 and the structure of the resonator 300 are merely exemplary of one configuration and structure that may be employed in accordance with example embodiments. For example, rather than a cylinder, the housing of the resonator 300 may be cube shaped or rectangular cube shaped. Further, the number and positioning of the temperature sensors 304 may be different. For example, the temperature sensors 304 may be positioned at the corners of a square or the apexes of another shape. Alternatively, according to some example embodiments, the temperature sensors 304 may be placed at any known location on the housing of the resonator 300. The frequency predicting neural network may be defined with respect to the known positions of the temperature sensors 304 to be able to determine temperature gradients based the temperature readings and the known locations of the temperature sensors 304.

Referring back to FIG. 2, the compensation circuitry 230 may be configured to receive the temperature measurements from a temperature sensor assembly 240, which may be configured as shown in FIGS. 3A-3C. Moreover, the compensation circuitry 230 may be configured to receive the uncompensated clock signal and the temperature measurements. The compensation circuitry 230 may be further configured to generate temperature data based on the temperature measurements. In this regard, the temperature measurement information may be conditioned for use by the neural network module 236 as temperature data. According to some example embodiments, the compensation circuitry 230 may be configured to generate the temperature data based on the temperature measurements such that the temperature data indicates a temperature gradient across the resonator 220 (e.g., in three dimensions). According to some example embodiments, the compensation circuitry 230 may be configured to store the temperature readings and/or the temperature data at a plurality of predetermined past times relative to a current time. Additionally, the compensation circuitry 230, via the neural network module 236, may be configured to apply the frequency predicting neural network to the temperature data to determine a frequency correction. According to some example embodiments, the frequency correction may be determined based on a temperature gradient across the resonator 220 indicated by the temperature data.

The compensation circuitry 230 may also be configured to apply the uncompensated clock signal and the frequency correction to the synthesizer 238 to generate the stabilized clock output signal for output to, for example, the communications interface 260 or the processing circuitry 270. According to some example embodiments, the synthesizer 238 may be a direct digital synthesizer configured to receive the uncompensated clock signal and the frequency correction and generate a stabilized clock output signal based on the uncompensated clock signal and the frequency correction. According to some example embodiments, the synthesizer 238 may operate both to apply the frequency correction for stability, but also to output a desired frequency signal that is different from the nominal frequency of the resonator 220.

As mentioned above, according to some example embodiments, the clock circuit 210 may also include a temperature control assembly 280. The temperature control assembly 280 may be implemented to apply thermal inputs to the resonator 220 in an effort to stabilize the temperature of the resonator 220. In this regard, in addition to performing the frequency correction, controllable thermal devices (e.g., power transistors, thermoelectric devices or coolers, such as thin-film superlattice thermoelectric devices) that can heat or cool, may be operably coupled to the resonator 220 to maintain a desired temperature of the resonator 220. According to some example embodiments, as shown in FIG. 3A, thermal devices 306 may be operably coupled to the housing 302 of a resonator 300 to control the temperature at the locations where the thermal devices 306 are located (e.g., symmetrically about the axis 301). The thermal devices may be controlled based on the temperature measurements from the temperature sensors of the temperature sensor assembly 240, a temperature feedback loop may be implemented by the compensation circuitry 230 where the thermal devices are continuously controlled to offset changes in temperature as detected by the temperature sensor assembly 240. Moreover, the temperature control assembly 280 may be configured to receive the temperature measurements and control one or more thermal devices to stabilize a temperature of the resonator 220. By controlling the temperature to generally remain within a predetermined range, the operation of the frequency predicting neural network may be simplified to operate efficiently within the desired range of temperatures. As stated above, such temperature control via the operation of the temperature control assembly 280 may be unable to maintain the temperature of the resonator 220 in an ideal range, and therefore such temperature control may be implemented with the frequency correction realize additional stability in the clock output.

Figure 4:
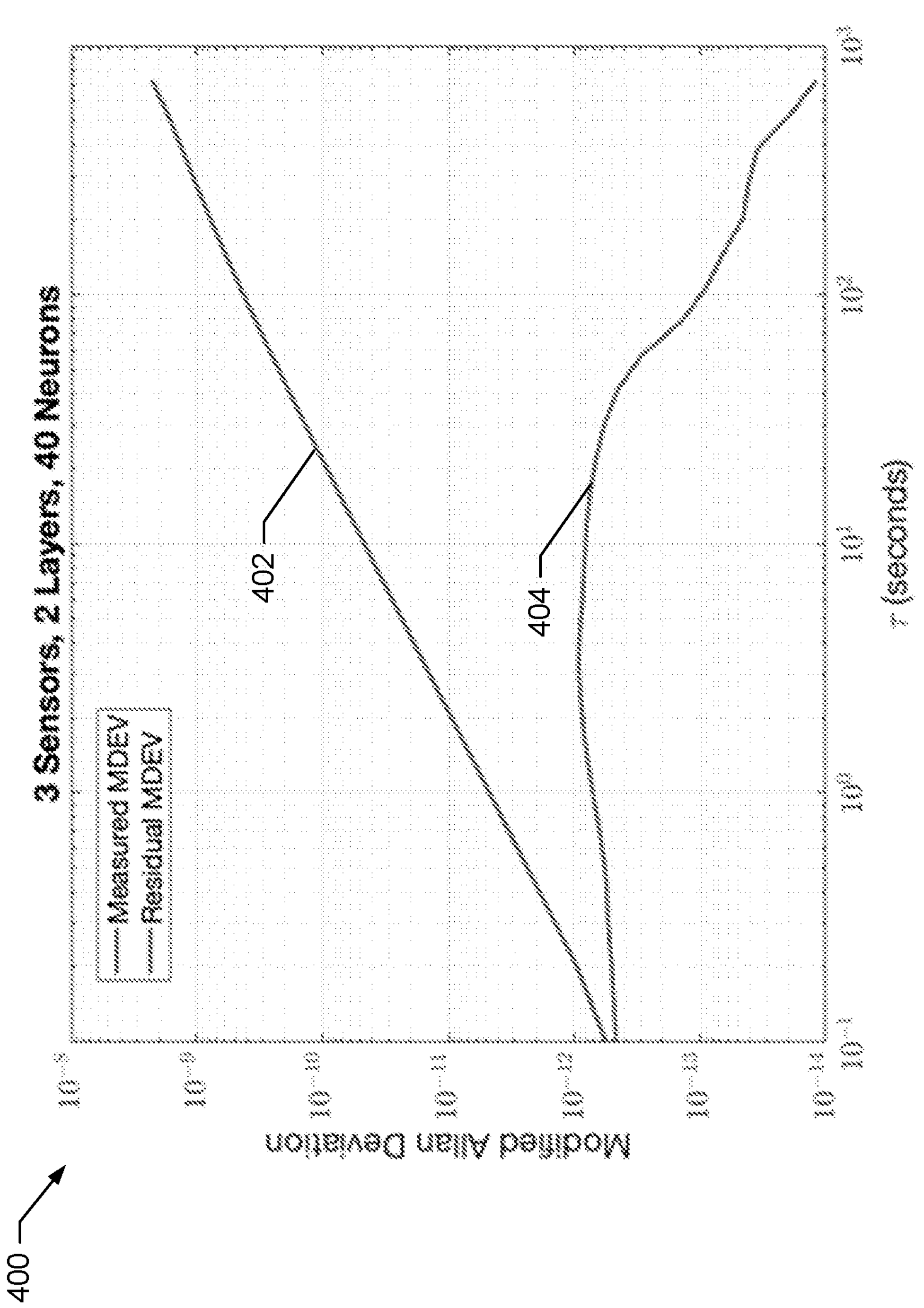
FIG. 4 illustrates a chart with graphs of stability measurements according to some example embodiments.

Referring now to FIG. 4, a chart 400 is shown that illustrates the stability results of an implementation of an example embodiment. In this regard, the example clock circuit used to generate the chart 400 employed 3 temperature sensors and a frequency predicting neural network that included 2 layers and 40 neurons. The y-axis of the chart 400 is defined as a modified Allan deviation, which is a measure of stability. The x-axis of the chart 400 is defined as time in seconds. Graph 402 (measured MDEV) is a measure of the instability of the uncompensated clock signal leaving the resonator. Graph 404 (residual MDEV) is a measure of the instability of the stabilized clock output signal of a clock circuit (e.g., clock circuit 210) according to some example embodiments. As can be seen, over time increased stability can be realized via various example embodiments.

Figure 5:
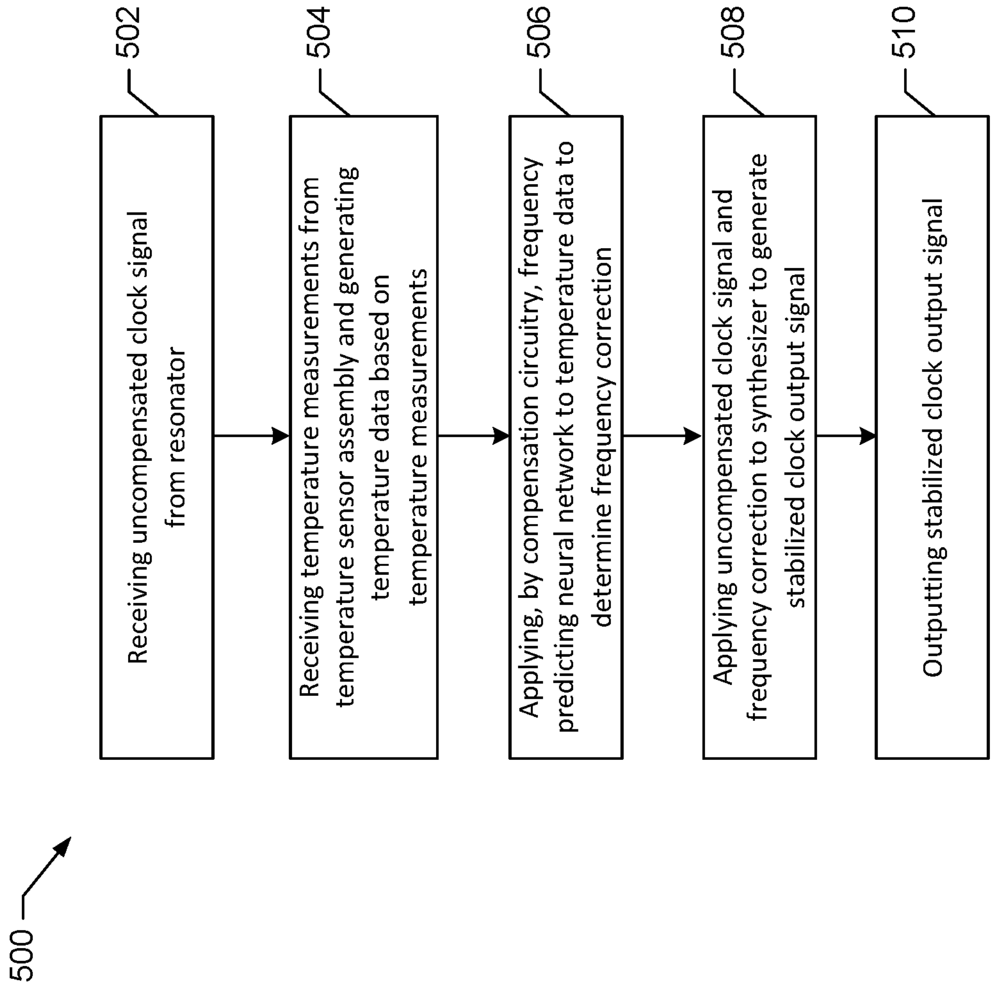
FIG. 5 illustrates a flow chart of an example method for implementing a clock circuit according to some example embodiments.

Now referring to FIG. 5 and the flowchart 500, an example method for implementing a clock circuit is provided, according to some example embodiments. The example method may include, at 502, receiving an uncompensated clock signal from a resonator, and, at 504, receiving temperature measurements from a temperature sensor assembly and generating temperature data based on the temperature measurements. In this regard, the temperature sensor assembly may be operably coupled to the resonator. At 506, the example method may further include applying, by compensation circuitry, a frequency predicting neural network to the temperature data to determine a frequency correction, and, at 508, applying the uncompensated clock signal and the frequency correction to a synthesizer to generate a stabilized clock output signal. Finally, the example method may further include, at 510, outputting the stabilized clock output signal.

According to some example embodiments, the temperature sensor assembly may include a plurality of temperature sensors operably coupled to the resonator, and the plurality of temperature sensors may be positioned symmetrically relative to the resonator. In this regard, the example method may further include generating the temperature data based on the temperature measurements such that the temperature data indicates a temperature gradient across the resonator in three dimensions, and determining the frequency correction based on the temperature gradient across the resonator indicated by the temperature data by the frequency predicting neural network.

According to some example embodiments, the example method may further include storing the temperature readings at a plurality of predetermined past times relative to a current time, and determining the frequency correction based on the temperature readings at the plurality of predetermined past times by the frequency predicting neural network. Further, according to some example embodiments, the example method may include storing the temperature readings at a plurality of predetermined past times relative to a current time, and generating the temperature data based on the temperature measurements such that the temperature data indicates a temperature gradient across the resonator (e.g., in three dimensions) and the temperature readings at the plurality of predetermined past times relative to the current time. Additionally, the example method may include determining, by the frequency predicting neural network, the frequency correction based on the temperature gradient across the resonator and the temperature readings at the plurality of predetermined past times relative to the current time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A clock circuit apparatus comprising:

a resonator configured to output an uncompensated clock signal;

a temperature sensor assembly operably coupled to the resonator, the temperature sensor assembly comprising a plurality of temperature sensors disposed in a non-coplanar arrangement relative to the resonator, the temperature sensor assembly being configured to measure temperatures and provide temperature measurements; and compensation circuitry configured to:

receive the uncompensated clock signal;

receive the temperature measurements;

generate temperature data based on the temperature measurements, the temperature data indicating a three-dimensional temperature gradient across the resonator;

apply a frequency predicting neural network to the temperature data to determine a frequency correction based on the three-dimensional temperature gradient across the resonator;

apply the uncompensated clock signal and the frequency correction to a synthesizer to generate a stabilized clock output signal; and output the stabilized clock output signal, wherein the frequency predicting neural network is a multi-layer artificial neural network that receives the temperature data as a vector of inputs defined in multiple dimensions, the multiple dimensions include location and time, and the frequency predicting neural network performs a weighted sum of the inputs to determine a resultant, and the frequency predicting neural network applies the resultant to a non-linear activation function to determine a predicted frequency for the resonator for use in generating the frequency correction.

2. The clock circuit apparatus of claim 1, wherein the synthesizer is a direct digital synthesizer configured to receive the uncompensated clock signal and the frequency correction and generate a stabilized clock output signal based on the uncompensated clock signal and the frequency correction.

3. The clock circuit apparatus of claim 1, further comprising a temperature control assembly configured to receive the temperature measurements and control a thermal device to stabilize a temperature of the resonator.

4. The clock circuit apparatus of claim 1, wherein the non-coplanar arrangement of the temperature sensors of the temperature sensor assembly comprises at least one temperature sensor of the plurality of temperature sensors being positioned at each of three non-coplanar surfaces of an exterior housing of the resonator.

5. The clock circuit apparatus of claim 1, wherein the compensation circuitry is configured to store temperature readings at a plurality of predetermined past times relative to a current time, and the frequency predicting neural network determines the frequency correction based on the temperature readings at the plurality of predetermined past times.

6. The clock circuit apparatus of claim 5, wherein times of the plurality of predetermined past times have an exponential relationship.

7. The clock circuit apparatus of claim 1, wherein the compensation circuitry is configured to:

store temperature readings at a plurality of predetermined past times relative to a current time; and generate the temperature data based on temperature readings at the plurality of predetermined past times relative to the current time; and wherein the frequency predicting neural network determines the frequency correction based on the temperature readings at the plurality of predetermined past times relative to the current time.

8. A communications device comprising:

an antenna;

a transmitter configured to output radio signals via the antenna in association with a stabilized clock output signal;

a receiver configured to receive radio signals via the antenna in association with the stabilized clock output signal; and a clock circuit comprising:

a resonator configured to output an uncompensated clock signal;

a temperature sensor assembly operably coupled to the resonator, the temperature sensor assembly comprising a plurality of temperature sensors disposed in a non-coplanar arrangement relative to the resonator, the temperature sensor assembly being configured to measure temperatures and provide temperature measurements; and compensation circuitry configured to:

receive the uncompensated clock signal;

receive the temperature measurements;

generate temperature data based on the temperature measurements, the temperature data indicating a three-dimensional temperature gradient across the resonator;

apply a frequency predicting neural network to the temperature data to determine a frequency correction based on the three-dimensional temperature gradient across the resonator;

apply the uncompensated clock signal and the frequency correction to a synthesizer to generate a stabilized clock output signal; and output the stabilized clock output signal to the transmitter and the receiver, wherein the frequency predicting neural network is a multilayer artificial neural network that receives the temperature data as a vector of inputs defined in multiple dimensions, the multiple dimensions include location and time, and the frequency predicting neural network performs a weighted sum of the inputs to determine a resultant, and the frequency predicting neural network applies the resultant to a non-linear activation function to determine a predicted frequency for the resonator for use in generating the frequency correction.

9. The communications device of claim 8, wherein the synthesizer is a direct digital synthesizer configured to receive the uncompensated clock signal and the frequency correction and generate a stabilized clock output signal based on the uncompensated clock signal and the frequency correction.

10. The communications device of claim 8, wherein the plurality of temperature sensors are positioned symmetrically relative to the resonator in the non-coplanar arrangement.

11. The communications device of claim 8, wherein the compensation circuitry is configured to store temperature readings at a plurality of predetermined past times relative to a current time, and the frequency predicting neural network determines the frequency correction based on the temperature readings at the plurality of predetermined past times.

12. The communications device of claim 11, wherein times of the plurality of predetermined past times have an exponential relationship.

13. The communications device of claim 8, wherein the plurality of temperature sensors are positioned symmetrically relative to the resonator, the compensation circuitry is configured to:

store temperature readings at a plurality of predetermined past times relative to a current time; and generate the temperature data based on the temperature readings at the plurality of predetermined past times relative to the current time; and the frequency predicting neural network determines the frequency correction based on the temperature readings at the plurality of predetermined past times relative to the current time.

14. A method for implementing a clock circuit, the method comprising:

receiving an uncompensated clock signal from a resonator;

receiving temperature measurements from a temperature sensor assembly, the temperature sensor assembly being operably coupled to the resonator and comprising a plurality of temperature sensors disposed in a non-coplanar arrangement relative to the resonator;

generating temperature data based on temperature measurements captured by each of the temperature sensors of the plurality of temperature sensors, the temperature data indicating a three-dimensional temperature gradient across the resonator;

applying, by compensation circuitry, a frequency predicting neural network to the temperature data to determine a frequency correction based on the three-dimensional temperature gradient across the resonator;

applying the uncompensated clock signal and the frequency correction to a synthesizer to generate a stabilized clock output signal; and outputting the stabilized clock output signal, wherein the frequency predicting neural network is a multi-layer artificial neural network that receives the temperature data as a vector of inputs defined in multiple dimensions, the multiple dimensions include location and time, and the frequency predicting neural network performs a weighted sum of the inputs to determine a resultant, and the frequency predicting neural network applies the resultant to a non-linear activation function to determine a predicted frequency for the resonator for use in generating the frequency correction.

15. The method of claim 14 further comprising:

storing temperature readings at a plurality of predetermined past times relative to a current time; and determining the frequency correction based on the temperature readings at the plurality of predetermined past times by the frequency predicting neural network.

16. The method of claim 14, wherein the method further comprises:

storing temperature readings at a plurality of predetermined past times relative to a current time;

generating the temperature data based on the temperature readings at the plurality of predetermined past times relative to the current time; and determining, by the frequency predicting neural network, the frequency correction based on the temperature readings at the plurality of predetermined past times relative to the current time.

* * * * *